UNITED STATES PATENT OFFICE 2,616,903

PREPARATION OF UNSATURATED STEROID ALCOHOLS

Romeo B. Wagner, State College, Pa., and James A. Moore, Detroit, Mich., assignors to Parke, Davis & Company, Detroit, Mich., a corporation of Michigan No Drawing. Application December 3, 1949, Serial No. 131,058

5 Claims. (Cl. 260—397.5)

This invention relates to the preparation of steroids. More particularly, the invention relates to the preparation of steroids of the pregnene series characterized by having a double bond at $C_{17}$—$C_{20}$ and a hydroxyl or ester group on $C_{21}$. These $\Delta^{17}$-pregnene compounds can be represented by the following formula,

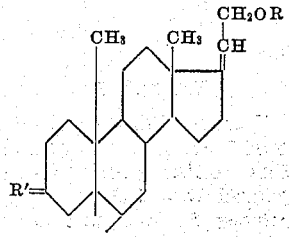

where R is hydrogen or a lower carboxylic acid acyl radical, R' is

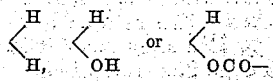

lower alkyl and the free valence bonds are attached either to each other, that is, forming a double bond, or separately to hydrogen atoms.

In accordance with the invention $\Delta^{17}$-pregnenes having the above formula are prepared by reducing the corresponding $\Delta^{17}$-pregnen-21-oic acids, or alkyl esters of same, having the formula:

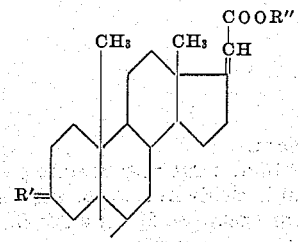

with lithium aluminum hydride in a lower aliphatic ether as a solvent. The reaction takes place smoothly in a short period of time and the usual temperature range is about 20–80° C. but preferably at 35–45° C. At the end of the reaction the intermediate complex is hydrolyzed by treatment with aqueous acid, preferably a dilute mineral acid such as dilute hydrochloric, hydrobromic or sulfuric acids.

Diagrammatically this transformation may be illustrated as follows:

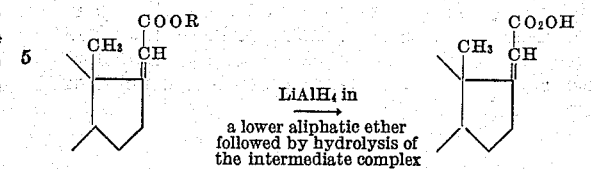

where R is hydrogen or a lower alkyl radical. The alcohols thus formed can be converted to the corresponding carboxylic acid acyl derivatives by treatment with the anhydride of a lower aliphatic carboxylic acid alone or in the presence of a basic substance such as an organic tertiary amine.

The products of the invention are useful intermediates for the preparation of organic compounds and, in particular, for the preparation of steroids similar in structure to those found in the adrenal cortex.

The following examples are illustrative:

Example 1

1.0 g. of methyl 3($\beta$)-hydroxy-17-pregnen-21-oate in ether is added to a solution of 250 mg. of lithium aluminum hydride in freshly distilled anhydrous ether. The addition requires a one-half hour period of time and the mixture refluxes meanwhile. After stirring for fifteen minutes longer, the mixture is treated with water to decompose the excess hydride and the reaction mixture is hydrolyzed at room temperature with dilute sulfuric acid. The ethereal solution is washed with water and dried with sodium sulfate and then concentrated. The white needles of $\Delta^{17}$-pregnen-3($\beta$),21-diol which separate are recrystallized from methanol to give 600 mg. of the product, M. P. 202–3° C., $(\alpha)_D^{25}$+27° (C=1.66 in dioxane) and whose structure is,

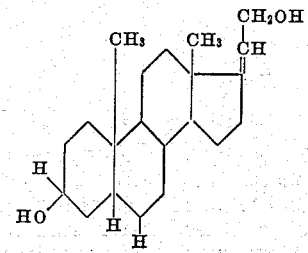

Example 2

303 mg. of methyl 3($\beta$)-hydroxy-$\Delta^{5,17}$-pregnadiene-21-oate in 50 cc. of ether is added over a one-half hour period to an ethereal solution of 180 mg. of lithium aluminum hydride. After hydrolysis of the reaction mixture with dilute hydrochloric acid, the ether solution is washed with water and dried. Upon concentration 237 mg. of 5,17-pregnadien-3($\beta$)-21-diol crystallizes from the ether; M. P. 197–8° C., $(\alpha)_D^{28}$ —53.5° (C=1.29 in ethanol). This product has the structure:

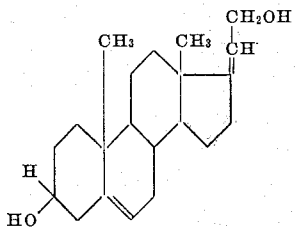

Example 3

754 mg. of methyl 17-allo-pregnen-21-oate is added over a one-half hour period to a solution of 450 mg. of lithium aluminum hydride. After treatment of the reaction mixture with water and dilute sulfuric acid, the ether layer is washed with water, dried and concentrated to yield colorless crystals of 17-allo-pregnen-21-ol which has the formula,

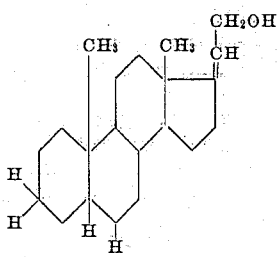

Example 4

500 mg. of the 17-allo-pregnen-21-ol as prepared in Example 3 is dissolved in a mixture of 5 cc. of acetic anhydride and 5 cc. of pyridine. After standing for one hour at room temperature, the mixture is poured into a large volume of cold water. The oil which separates is extracted with ether. The extract is washed with dilute hydrochloric acid, water, dilute sodium bicarbonate and then again with water and finally dried. Concentration of the solution yields a product which crystallizes from ether-pentane as a white crystalline solid, M. P. 101–2° C. This product has the structure:

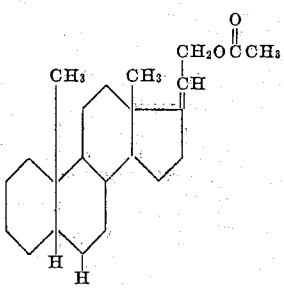

Example 5

290 mg. of 3($\beta$)-hydroxy-$\Delta^{5,17}$-pregnadien-21-oic acid in ether is added over a one-half hour period to a solution of 180 mg. of lithium aluminum hydride in ether. After standing about one-half hour longer, the mixture is treated with water and dilute sulfuric acid. The ether layer is washed with water, dried and concentrated until white needles of $\Delta^{5,17}$-pregnadien-3($\beta$),21-diol separate. This product is identical with that prepared in Example 2 as evidenced by a mixed melting point which showed no depression.

Example 6

1.7 g. of $\Delta^{17}$-pregnen-3($\beta$),21-diol is added to a mixture of 10 cc. of acetic anhydride and 10 cc. of pyridine. After standing one hour the mixture is poured into 500 cc. of water. This mixture is stirred for one-half hour and then extracted with ether. The ether layer is washed with dilute hydrochloric acid, water, dilute sodium bicarbonate and water, and is then dried and concentrated. The residue is recrystallized from ether-pentane to give large white prisms of the diacetate of $\Delta^{17}$-pregnen-3($\beta$),21-diol, M. P. 118–119° C., $(\alpha)_D^{25}$ +29.5° (C=1.69 in chloroform), and having the structure:

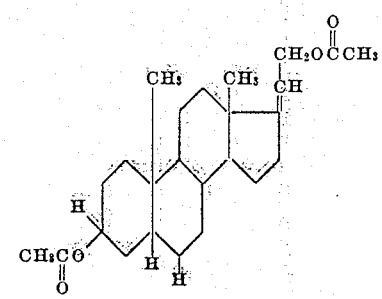

Example 7

1.0 g. of $\Delta^{5,17}$-pregnadien-3($\beta$),21-diol is added to a mixture of 7 cc. of acetic anhydride and 7 cc. of pyridine. After standing one hour the mixture is poured into 300 cc. of water. This mixture is stirred for one-half hour and then extracted with ether. The ether layer is washed with dilute hydrochloric acid, water, dilute sodium bicarbonate and water and is then dried and concentrated. The residue is recrystallized from pentane to give silky needles of the diacetate of $\Delta^{5,17}$-pregnadien-3($\beta$),21-diol, M. P. 135–136° C., and having the structure:

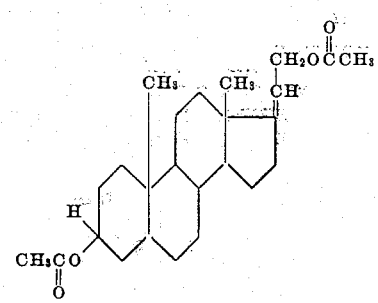

What we claim is:

1. Process which comprises reacting with lithium aluminum hydride in a lower aliphatic ether at a temperature between 20° and 80° C., a steroid having at ring D the structure,

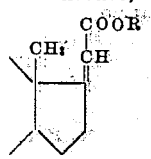

where R is a member of the class consisting of hydrogen and lower alkyl radicals and hydrolyzing the intermediate complex so formed with aqueous acid thereby obtaining a steroid alcohol having at ring D the structure,

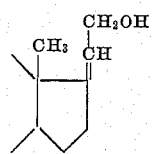

2. Process which comprises reacting a steroid having the structure,

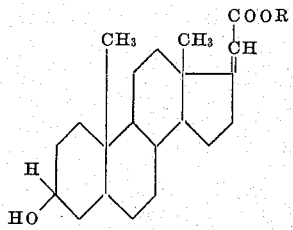

with lithium aluminum hydride in a lower aliphatic ether at a temperature between 20° and 80° C. and hydolyzing the intermediate complex so formed with aqueous acid thereby obtaining a steroid alcohol having the formula,

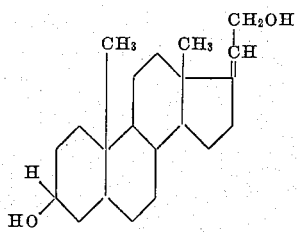

where R is a member of the class consisting of hydrogen and lower alkyl radicals.

3. Process according to claim 2 which comprises thereafter reacting said steroid alcohol with the anhydride of a lower aliphatic carboxylic acid alone or in the presence of an alkaline substance to obtain an ester of a steroid alcohol having the formula,

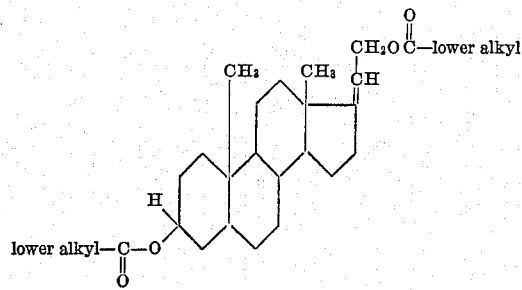

4. Process which comprises reacting a steroid having the structure,

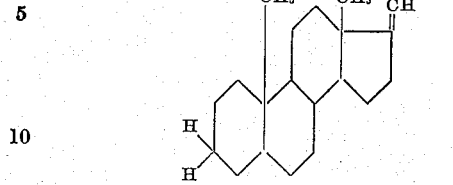

with lithium aluminum hydride in a lower aliphatic ether at a temperature between 20° and 80° C. and hydrolyzing the intermediate complex so formed with aqueous acid thereby obtaining a steroid alcohol having the formula,

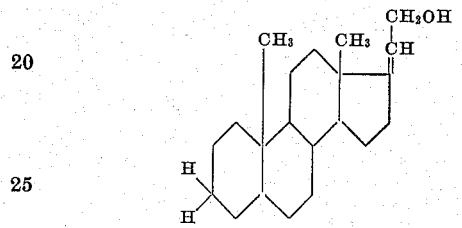

where R is a member of the class consisting of hydrogen and lower alkyl radicals.

5. Process according to claim 4 which comprises thereafter reacting said steroid alcohol with the anhydride of a lower aliphatic carboxylic acid alone or in the presence of an alkaline substance to obtain an ester of a steroid alcohol having the formula,

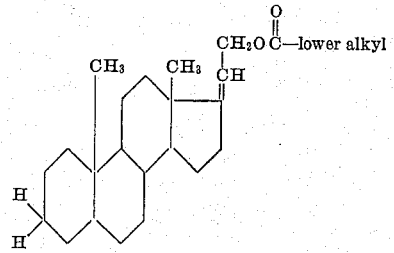

ROMEO B. WAGNER.
JAMES A. MOORE.

REFERENCES CITED

The following references are of record in the file of this patent:

UNITED STATES PATENTS

| Number | Name | Date |
| --- | --- | --- |
| 2,205,627 | Miescher | June 25, 1940 |
| 2,259,698 | Johannessohn | Oct. 21, 1941 |

OTHER REFERENCES

Nystrom, Jour. Am. Chem. Soc. 69, 1197–1199 (1947).